(12) United States Patent
Chou

(10) Patent No.: US 8,013,576 B2
(45) Date of Patent: Sep. 6, 2011

(54) SYSTEMS AND METHODS FOR SUPPLYING POWER TO AN ELECTRONIC DEVICE

(75) Inventor: Chih-Wei Chou, Taipei County (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 551 days.

(21) Appl. No.: 12/261,043

(22) Filed: Oct. 30, 2008

(65) Prior Publication Data

US 2009/0267567 A1    Oct. 29, 2009

(30) Foreign Application Priority Data

Apr. 28, 2008   (CN) ...................... 2008 1 0301361.4

(51) Int. Cl.
  *H02J 7/00*    (2006.01)
(52) U.S. Cl. .......................... 320/134; 320/148; 320/164
(58) Field of Classification Search .................. None
  See application file for complete search history.

(56) References Cited

U.S. PATENT DOCUMENTS 5,166,595 A * 11/1992 Leverich ........................ 320/139
6,946,817 B2 * 9/2005 Fischer et al. ................. 320/132

* cited by examiner

*Primary Examiner* — Minh N Tang
(74) *Attorney, Agent, or Firm* — Altis Law Group, Inc.

(57) ABSTRACT

A method which supplies power to an electronic device from a power supply device. The method includes setting a minimum power level of a power supply battery of a power supply device, detecting a current power level of the power supply battery and determining a current supply of the power supply battery, determining if the current supply exceeds a preset minimum power level, setting a required power level for extracting power from the power supply battery, extracting the power from the power supply battery according to a preset required power level, and transferring the power to a power charging battery of the electronic device. A related system is also provided.

19 Claims, 4 Drawing Sheets

SYSTEMS AND METHODS FOR SUPPLYING POWER TO AN ELECTRONIC DEVICE

BACKGROUND

1. Field of the Invention

Embodiments of the present disclosure are related to power supply, and in particular to a system and method for supplying power to an electronic device.

2. Description of Related Art

Portable digital electronic devices in everyday use rely on portable power storage to function continuously. However, portable power storage, such as a battery, requires replacement or recharging when supply falls below a working threshold. Usually such batteries utilize direct current (DC), power supply estimated by a voltage level of the battery.

Portable digital electronic devices, such as mobile phones largely, use the same working voltage of 3.6 Volts (V), with most employing flat batteries attached to one end of the device. Among numerous charging technologies, connection of an adapter of the device to a power jacket is commonly used, wherein an adapter connects the battery and an alternating current (AC) electric grid, and converts the supplied AC current of 220V/110V to direct current (DC) of 5V to recharge the battery. Other technologies utilize conversion of kinetic energy to DC power by hand movement, conversion of solar power to DC power by solar panel, and conversion of wind energy to DC power, and many others. However, all require bulky conversion and charging systems, decreasing the portability and convenience of the portable digital electronic device.

Many mobile phones currently use Universal Serial Bus (USB) interfaces as a standard data and power supply connection based on information disclosed by the Open Mobile Terminal Platform (OMTP) forum. Other portable digital electronic devices besides mobile phones use the USB connector interface as well. Nonetheless, there is currently no explicit method for recharging one portable digital electronic device from another by a USB connector.

Therefore, what is needed is a system and method for supplying power from a portable device, particularly for supplying power from one battery to another.

SUMMARY

A method for supplying power to an electronic device from a power supply device is provided. The method includes setting a minimum power level of the power supply battery, measuring a current power level of a power supply battery of the power supply device and determining a current supply of the power supply battery of the power supply device, determining if the current supply of the power supply battery exceeds a preset minimum power level, setting a required power level if the current supply of the power supply battery exceeds the preset minimum power level, and charging the power charging battery of the electronic device by extracting power from the power supply battery according to the required power level and transferring the power to the power charging battery.

Other advantages and novel features of the present disclosure will become more apparent from the following detailed description of certain inventive embodiments when taken in conjunction with the accompanying drawings.

DETAILED DESCRIPTION OF CERTAIN INVENTIVE EMBODIMENTS

Figure 1:
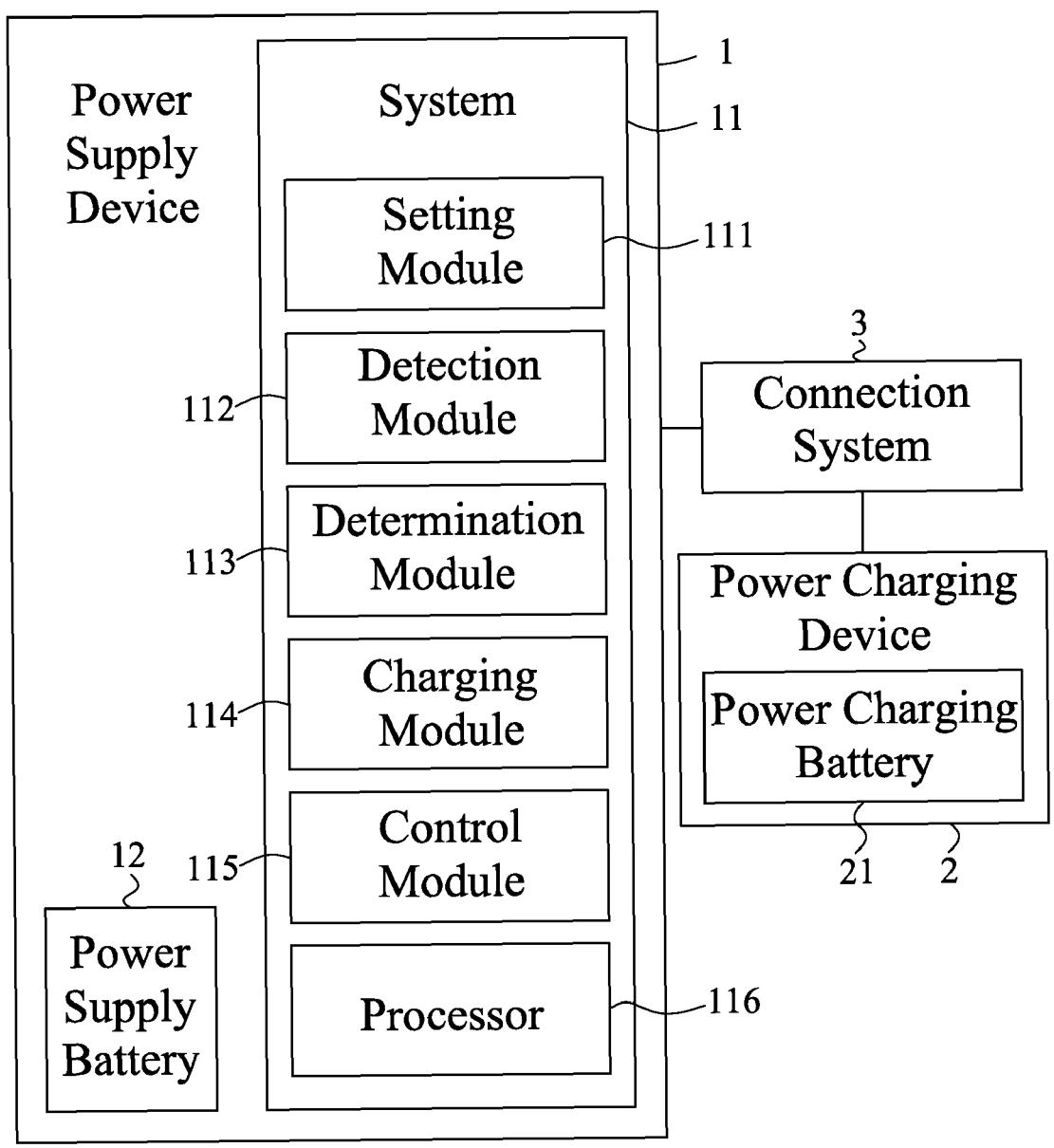
FIG. 1 is a block diagram of an embodiment of a system for supplying power to an electronic device.

All of the processes described may be embodied in, and fully automated from, software code modules executed by one or more general purpose computers or processors as depicted in FIG. 1. The code modules may be stored in any type of computer-readable medium or other storage device. Some or all of the methods may alternatively be embodied in specialized computer hardware or communication apparatus.

FIG. 1 is a block diagram of an embodiment of a system 11 for supplying power to an electronic device (hereinafter referred to as a power supply device 1). The system 11 for supplying power may be embodied in the power supply device 1, which is connected to a power charging device 2 from a connection system 3. In the embodiment of the present disclosure, the power supply device 1 supplies power to the power charging device 2 via the system 11, and the power charging device 2 is recharged. In addition, the power supply device 1 and the power charging device 2 each require the same type of connection interface to the connection system 3. In an embodiment, the connection system 3 is a cable with Universal Serial Bus (USB) interfaces on both ends, with the power supply device 1 and the power charging device 2 providing corresponding USB interfaces. While the disclosure describes mobile phones as the devices, 1 and 2, any kind of portable powered electronic device can be equally applicable while remaining well within the scope of the disclosure.

The power supply device 1 also includes a power supply battery 12, and the power charging device 2 includes a power charging battery 21. It may be understood that the power supply battery 12 and the power charging battery 21 may be nickel-cadmium (NiCd), nickel metal hydride (NiMH) or lithium-ion (Li-ion), and may respectively be the same type or different types, although maximum battery operating life is better served by both batteries 12 and 21 to be of the same type.

The system 11 is configured for charging the power charging battery 21 of the power charging device 2 from the power supply battery 12 of the power supply device 1 when the power charging battery 12 has a higher supply percentage. The system 11 charges the power charging battery 21 by extracting power from the power supply battery 12 of the power supply device 1, transferring the extracted power to the power charging battery 21 of the power charging device 2, thus satisfying a temporary power requirement of the power charging device 2 if the supply of the power charging battery 21 is lower than a preset operating level.

In an embodiment, the system 11 includes a setting module 111, a detection module 112, a determination module 113, a charging module 114, a control module 115, and a processor 116. The modules 111, 112, 113, 114, 115 may be used to execute one or more operations for the power supply device 1. Additionally, the power supply device 1 may comprise one or more specialized or general purpose processors, such as a processor 116 for executing the modules 111, 112, 113, 114, 115.

The setting module 111 is configured for setting a minimum power level of the power supply battery 12. For example, if the minimum power level of the power supply battery 12 is set to 40%, the system 11 only allows the power supply battery 12 to charge the power charging battery 21 from the power supply device 1 if the supply of the power supply battery 12 exceeds 40%. Further, the system 11 prohibits power supply battery 12 from charging the power charging battery 21 if the supply is less than or equal to 40%.

The detection module 112 is configured for measuring a current power level of the power supply battery 12 of the power supply device 1, and determining a current supply of the power supply battery 12 of the power supply device 1. Usually, power level of a battery is measured in Ampere-hour (Ah) or milli-Ah (mAh). The current supply of the power supply battery 12 is determined by dividing the current power level of the power supply battery 12 by a total electric capacity of the power supply battery 12. For example, for a battery with a total electric capacity of 1000 mAh, the current supply of the battery is 800/1000, i.e. 80%, if the current power level of the battery is detected by the detection module 112 as 800 mAh.

The determination module 113 is configured for determining if the current supply of the power supply battery 12 exceeds the preset minimum power level. If the current supply of the power supply battery 12 exceeds the preset minimum power level, the power supply battery 12 is allowed to charge the power charging battery 21 of the power charging device 2. Otherwise if the current supply of the power supply battery 12 does not exceed the preset minimum power level, if the current supply of the power supply battery 12 is less than or equal to the preset minimum power level, the power supply battery 12 does not charge the power charging battery 21 of the power charging device 2.

The control module 115 is configured for ceasing charging the power charging battery 21, and issuing a notification that the power supply battery 12 is at a low power level if the current supply of the power supply battery 12 is less than or equal to the preset minimum power level. In an embodiment, the notification may be an audio, mechanical vibration, text message, visual alert and/or a combination of four on the power supply device 1.

The setting module 111 is also configured for setting a required power level if the current supply of the power supply battery 12 exceeds the preset minimum power level. In an embodiment, the setting module 111 provides a configuration interface for setting the required power level or selecting a required supply. The setting module 111 is further configured for converting a required supply set by the user to a corresponding power level when the required supply is input from the configuration interface.

The charging module 114 is configured for charging the power charging battery 21 of the power charging device 2 by extracting power according to the required power level from the power supply battery 12 of the power supply device 1, and transferring the extracted power to the power charging battery 21. During the charging procedure, the detection module 112 and the determination module 113 determines if the current supply exceeds the preset minimum power level. If the current supply is less than or equal to the preset minimum power level, the control model 115 ceases extracting power from the power supply battery 12 and issues a notification that power supply battery 12 is at the low power level. As mentioned previously, the notification may be an audio, mechanical vibration, text message, visual alert and/or a combination of four on the power supply device 1.

Figure 2A:
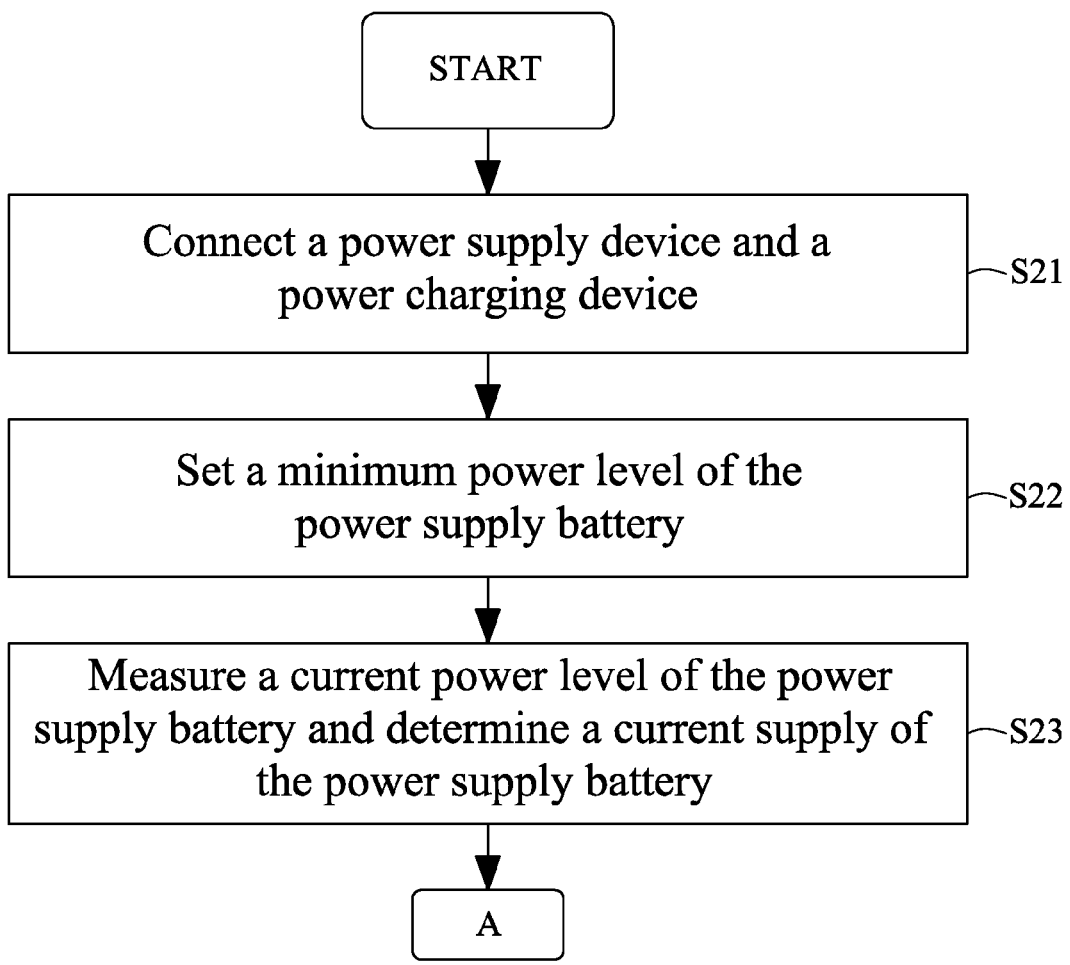
FIGS. 2A and 2B (hereinafter FIG. 2) are flowcharts of an embodiment of a method for supplying power to an electronic device.
Figure 2B:
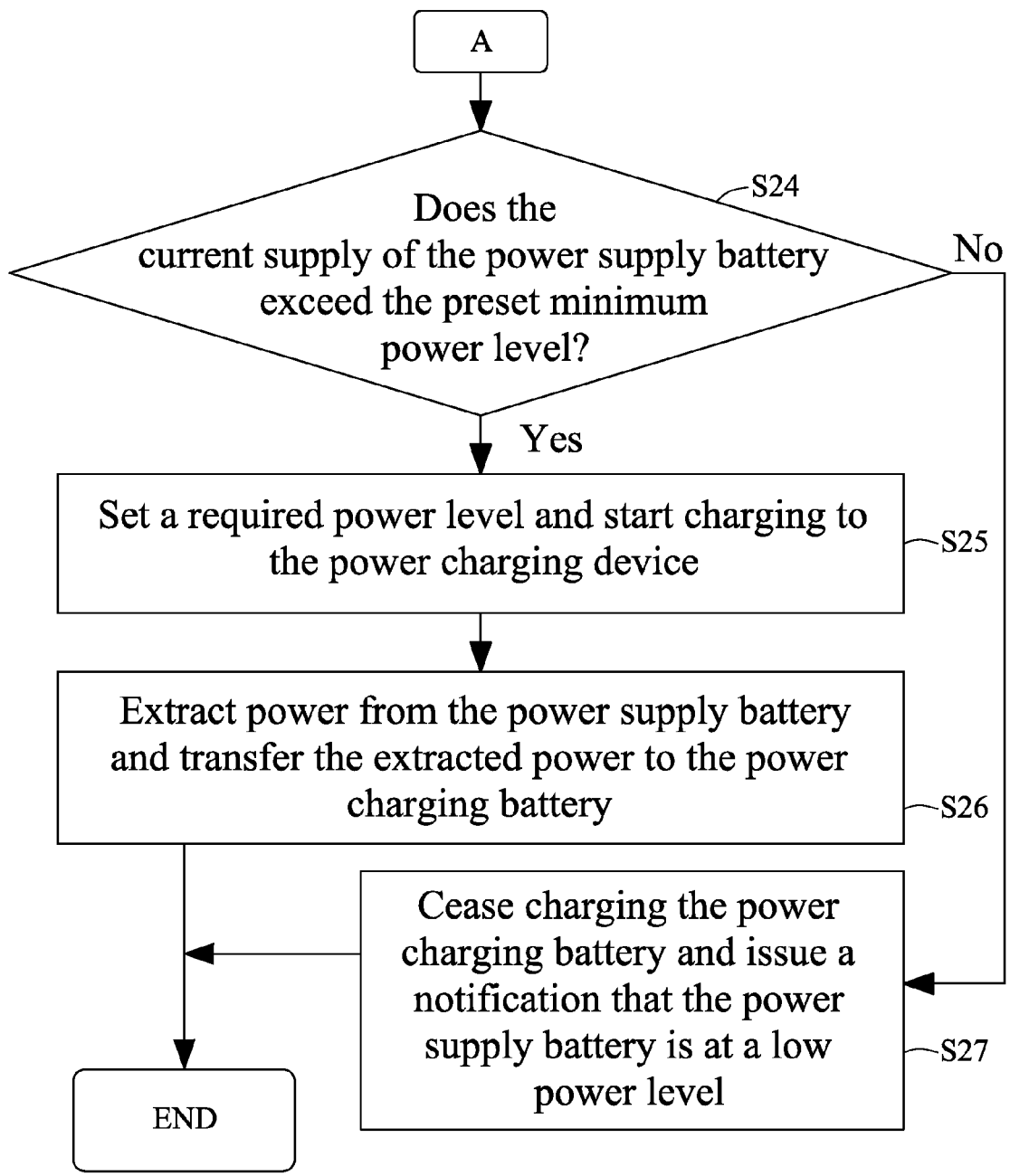

FIG. 2 is a flowchart of an embodiment of a method for supplying power to an electronic device. Depending on the embodiment, additional blocks may be added, others deleted, and the ordering of the blocks may be changed. First, in block S21, the connection system 3 connects the power supply device 1 and the power charging device 2. As mentioned previously, in the embodiment of the present disclosure, the connection system uses a USB connection with the appropriate interfaces on both ends, with both the power supply device 1 and the power charging device 2 including corresponding USB interfaces.

In block S22, the setting module 111 sets the minimum power level of the power supply battery 12.

In block S23, the detection module 112 measures the current power level of the power supply battery 12 and determines the current supply of the power supply battery 12. The current supply of the power supply battery 12 is determined by dividing the current power level of the power supply battery 12 by the total electric capacity of the power supply battery 12.

In block S24, the determination module 113 determines if the current supply of the power supply battery 12 exceeds the preset minimum power level.

In block S25, if the current supply of the power supply battery 12 exceeds the preset minimum power level, the setting module 111 sets the required power level. In the embodiment of the present disclosure, the setting module 111 also provides the configuration interface for setting the required power level or selecting the required supply. The desired extraction amount can be set or required extraction percentage selected. As mentioned previously, the setting module 111 automatically converts a required preset supply to a corresponding power level if input.

In block S26, the charging module 114 charges the power charging battery 21 of the power charging device 2 by extracting power from the power supply battery 12 according to the required power level from the power supply battery 12 of the power supply device 1, and transferring the extracted power to the power charging battery 21.

In block S27, if the current supply of the power supply battery 12 is less than or equal to the preset minimum power level in block S14, the control module 115 directs the power supply battery 12 to not charge the battery 21 and issues a notification that the power supply battery 12 is at a low power level.

Figure 3:
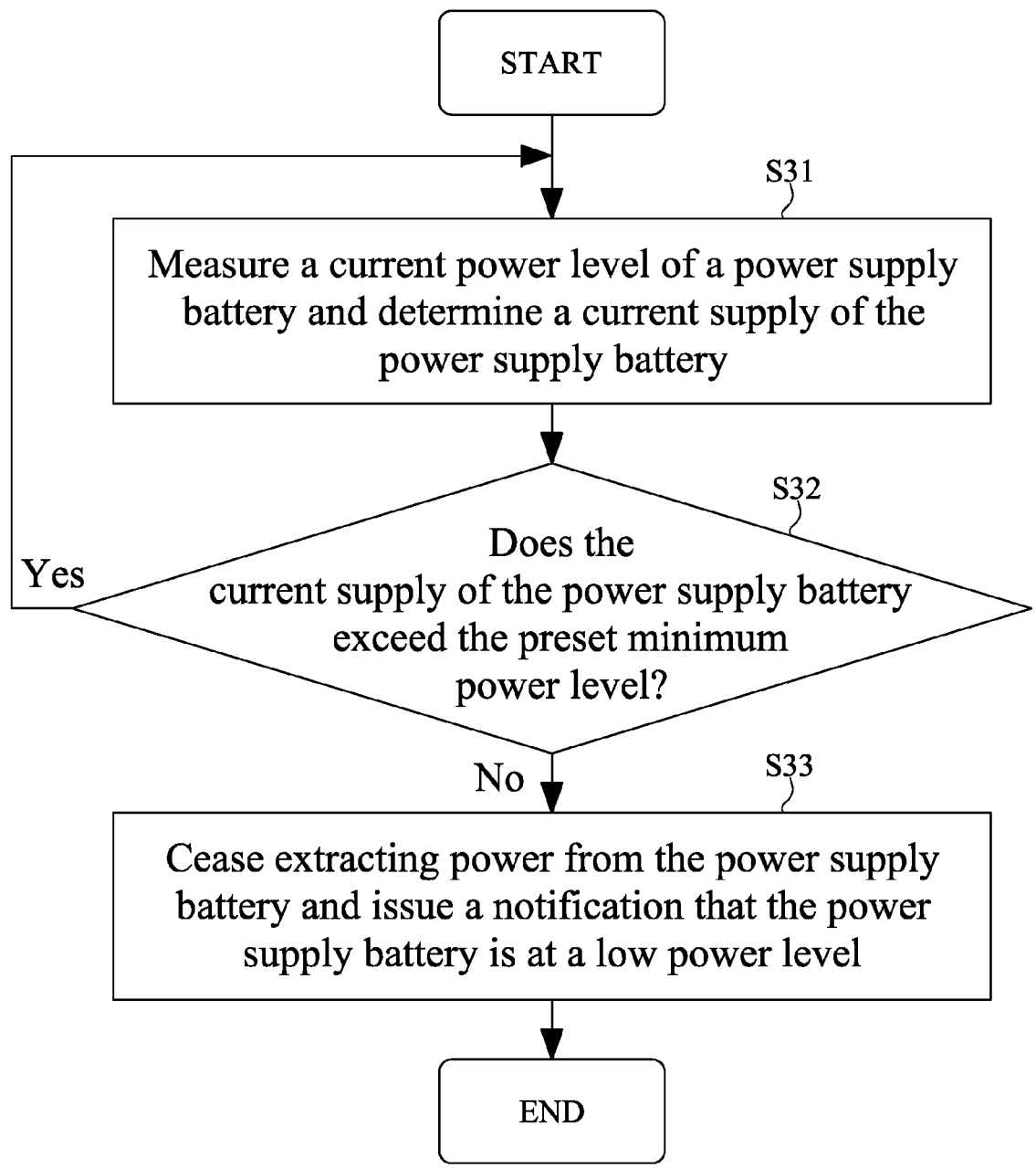
FIG. 3 is a detailed flowchart of one embodiment of a method for supplying power to the electronic device of FIG. 2.

FIG. 3 is a detailed flowchart of block S26 of the method for supplying power to the electronic device of FIG. 2.

In block S31, the detection module 112 measures a current power level of the power supply battery 12 of the power supply device 1 and determines a current supply of the power supply battery 12 of the power supply device 1. The current supply of the power supply battery 12 is determined by dividing the current power level of the power supply battery 12 divided by a total electric capacity of the same power supply battery 12.

In block S32, the determination module 113 determines if the current supply of the power supply battery 12 exceeds the preset minimum power level.

In block S33, if the current power level of the power supply battery 12 is less than or equal to the preset minimum power level, the control model 115 ceases extracting power from the power supply battery 12 and issues a notification that the power supply battery 12 is at a low power level.

In block S32, if the current power level of the power supply battery 12 exceeds the preset minimum power level, the block S31 is repeated.

It should be emphasized that the above-described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. A computing system for supplying power to an electronic device from a power supply device, the power supply device comprising a power supply battery and the electronic device comprising a power charging battery, the system comprising:
   a setting module configured for setting a minimum power level of the power supply battery of the power supply device;
   a detection module configured for measuring a current power level of the power supply battery of the power supply device, and determining a current supply of the power supply battery of the power supply device;
   a determination module configured for determining if the current supply of the power supply battery exceeds a preset minimum power level;
   the setting module further configured for setting a required power level if the current supply of the power supply battery exceeds the preset minimum power level;
   a control module configured for ceasing charging the power charging battery of the electronic device if the current supply of the power supply battery is less than or equal to the preset minimum power level;
   a charging module configured for extracting power according to the required power level, and transferring the extracted power to the power charging battery of the electronic device; and
   at least one processor executing the setting module, the detection module, the determination module, the control module, and the charging module to supply power from the power supply battery of the power supply device to the power charging battery of the electronic device.

2. The system as claimed in claim 1, wherein the electronic device is connected to the power supply device by a connection system.

3. The system as claimed in claim 2, wherein the connection system is a cable with Universal Serial Bus (USB) interfaces on both ends, and both the power supply device and the electronic device comprise corresponding USB interfaces.

4. The system as claimed in claim 1, wherein the control module is further configured for issuing a notification that the power supply battery is at a low power level if the current supply of the power supply battery is less than or equal to the preset minimum power level.

5. The system as claimed in claim 1, wherein the detection module measures the current supply of the power supply battery and the determination module determines if the current supply of the power supply battery exceeds the preset minimum power level during charging of the power charging battery of the electronic device by the charging module.

6. The system as claimed in claim 5, wherein the control module is further configured for ceasing power extraction from the power supply battery if the current supply of the power supply battery is less than or equal to the preset minimum power level.

7. The system as claimed in claim 4, wherein the notification issued by the control module is a selected from the group consisting of an audio alert, a mechanical vibration, a text message, and a visual alert on the power supply device.

8. A computer-implemented method for supplying power to an electronic device from a power supply device, the power supply device comprising a power supply battery and the electronic device comprising a power charging battery, the method comprising:
   setting a minimum power level of the power supply battery;
   measuring a current power level of the power supply battery of the power supply device and determining a current supply of the power supply battery of the power supply device;
   determining if the current supply of the power supply battery exceeds a preset minimum power level;
   setting a required power level if the current supply of the power supply battery exceeds the preset minimum power level; and
   charging the power charging battery of the electronic device by extracting power from the power supply battery according to the required power level and transferring the power to the power charging battery.

9. The method as claimed in claim 8, wherein the electronic device is connected to the power supply device by a connection system.

10. The method as claimed in claim 9, wherein the connection system is a cable with Universal Serial Bus (USB) interfaces on both ends, and both the power supply device and the electronic device comprise corresponding USB interfaces.

11. The method as claimed in claim 8 wherein the determination procedure further comprises issuing a notification that the power supply battery is at a low power level if the current supply of the power supply battery is less than or equal to the preset minimum power level.

12. The method as claimed in claim 8 wherein the method further comprises ceasing charging the power charging battery of the power charging device if the current supply of the power supply battery is less than or equal to the preset minimum power level.

13. The method as claimed in claim 8, further comprising, during charging:
   detecting the current power level of the power supply battery of the power supply device and determining the current supply of the power supply battery;
   determining if the current supply of the power supply battery exceeds the preset minimum power level; and
   ceasing power extraction from the power supply battery if the current power level of the power supply battery of the power supply device is less than or equal to the preset minimum power level.

14. A computer-readable medium having stored thereon instructions that, when executed by a computer, cause the computer to perform a method for supplying power to an electronic device from a power supply device, the power supply device comprising a power supply battery and the electronic device comprising a power charging battery, the method comprising:
   setting a minimum power level of the power supply battery;
   measuring a current power level of the power supply battery of the power supply device and determining current supply of the power supply battery of the power supply device;
   determining if the current supply of the power supply battery exceeds a preset minimum power level;
   setting a required power level if the current supply of the power supply battery exceeds the preset minimum power level; and
   charging the power charging battery of the electronic device by extracting the power from the power supply battery according to the required power level and transferring the power to the power charging battery.

15. The computer-readable medium as claimed in claim 14, wherein the electronic device is connected to the power supply device by a connection system.

16. The computer-readable medium as claimed in claim 15, wherein the connection system is a cable with Universal Serial Bus (USB) interfaces on both ends, and both the power supply device and the electronic device comprise corresponding USB interfaces.

17. The computer-readable medium as claimed in claim 14, wherein the determination procedure further comprises issuing a notification that the power supply battery is at a low power level if the current supply of the power supply battery is less than or equal to the preset minimum power level.

18. The computer-readable medium as claimed in claim 14, wherein the method further comprises ceasing charging the power charging battery of the power charging device if the current supply of the power supply battery is less than or equal to the preset minimum power level.

19. The computer-readable medium as claimed in claim 14, further comprising, during charging procedure:
- detecting the current power level of the power supply battery of the power supply device and determining the current supply of the power supply battery;
- determining if the current supply of the power supply battery exceeds the preset minimum power level; and
- ceasing power extraction from the power supply battery if the current power level of the power supply battery of the power supply device is less than or equal to the preset minimum power level.

* * * * *